UNITED STATES PATENT OFFICE.

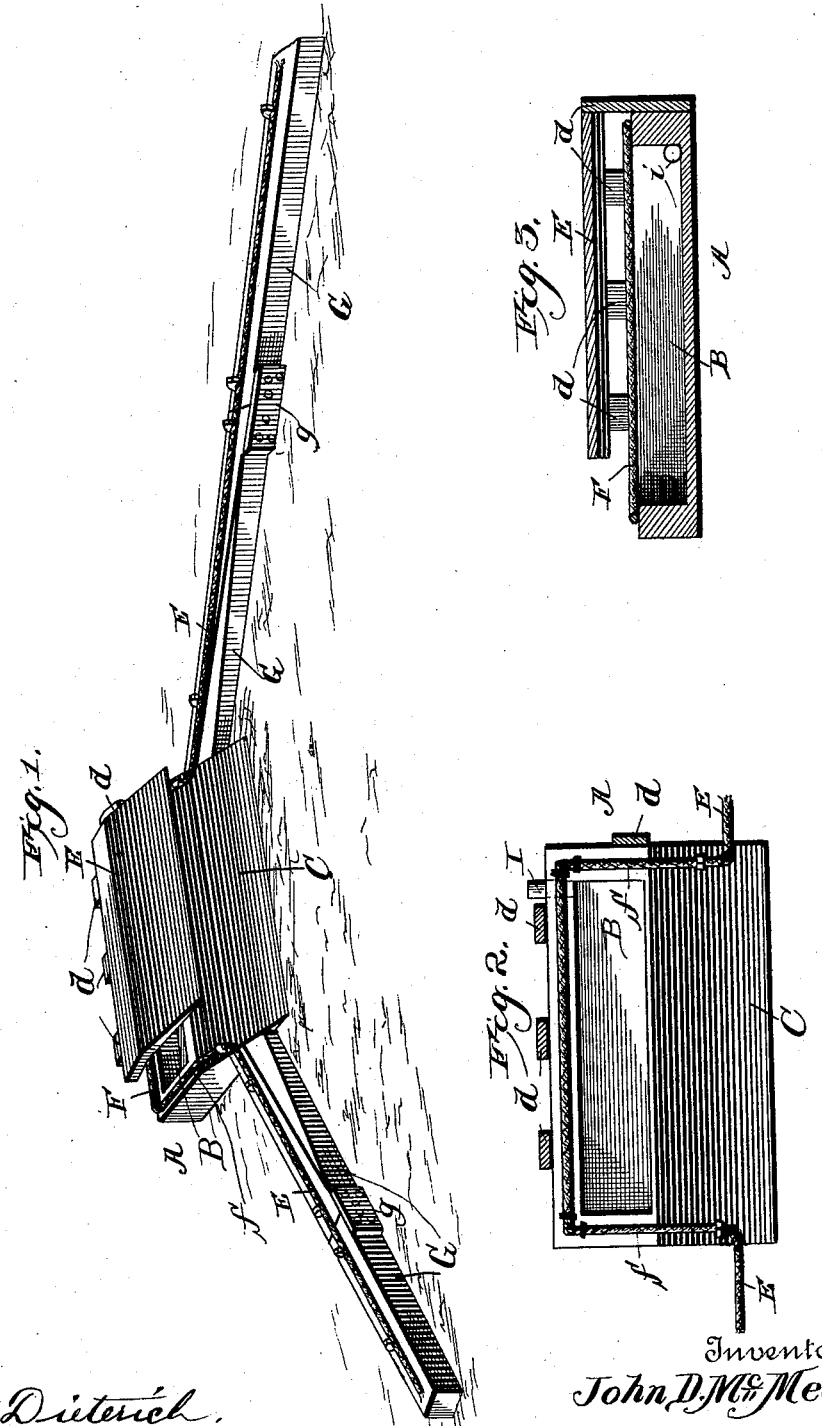

JOHN D. McMEEN, OF MOUNT VERNON, ILLINOIS.

INSECT-TRAP.

SPECIFICATION forming part of Letters Patent No. 393,778, dated December 4, 1888.

Application filed August 23, 1888. Serial No. 283,533. (No model.)

*To all whom it may concern:*

Be it known that I, JOHN D. MCMEEN, a citizen of the United States, residing at Mount Vernon, in the county of Jefferson and State of Illinois, have invented a new and useful Improvement in Devices for Killing Chinch-Bugs, of which the following is a specification.

The invention is a device for killing chinch-bugs when endeavoring to destroy fields of corn, oats, wheat, or grain of any kind; and it consists in the construction and novel combination of parts hereinafter described, illustrated in the accompanying drawings, and pointed out in the appended claims.

Figure 1 of the drawings represents a perspective view of the device resting on the ground in a suitable position. Fig. 2 represents a plan view of one of the pits or traps with the cover or shade removed to show the interior. Fig. 3 represents a central longitudinal section of one of the traps.

It has been found by experiment that the young chinch-bugs before their wings have grown or extended cannot or will not pass over a tarred cord or string, and the invention is based upon this demonstrated fact.

A designates one of the said traps, having the chamber or box B provided with vertical sides and ends, the inclined plane C, leading up to one side of said chamber, and the posts or standards $d$, rising from the opposite side of the chamber and having secured to their ends the board or cover E, that overhangs the chamber and prevents the sun from striking on the bugs therein and causing them to go back whence they came.

F is a tarred piece of cord or twine running along the top of the chamber B adjacent to the posts, and $ff$ are similar but shorter cords extending across the top of said chamber near the ends thereof. Thus escape of the bugs from the chamber B is cut off at the ends and one side, and they are permitted to approach only up the incline plane C.

G G are strips of wood secured to the ends of the chamber B and to each other end to end, the said ends being connected by leather straps $g$ or otherwise. To the tops of the said strips is secured the tarred cord E, that is continuous from and between the end cords, F, of the chambers B of the traps. The said strips are laid in the path of the chinch-bugs to protect a threatened field of grain, and the traps are placed in connection therewith at suitable intervals apart.

As the wingless insects cannot pass over the tarred cord, they crawl alongside thereof, and then up the inclined planes C to the accessible side of the chambers B, into which they enter, and, failing to pass over the tarred cord, they remain quiet and collect in the chambers or boxes in large masses. When the insects have been destroyed by pouring boiling water on them, they, with the contained water, may be removed from the chamber B by drawing out the plugs I, that stop the openings $i$ in the ends of the chambers B, communicating with the lower portions of said chambers.

The sides and ends of the chambers being vertical, and the chambers being shaded by the covers E, so that the bugs cannot be heated by the sun, the insects are quiet and make no attempt to escape, but are quickly killed by the hot water that is poured into the boxes.

If desired, a wire may be substituted for the cord, as the essential element is the coating of tar, over which the insects cannot crawl.

Having described my invention, I claim—

1. In a device to kill chinch-bugs and similar insects, the combination of cords or wires covered with coatings of tar and placed in the path of said insects and suitable traps connected with said cords or wires, to which traps the insects are directed by the cords or wires, and from which they cannot escape after entering therein, substantially as specified.

2. The combination of the traps provided with chambers B and inclined planes C, leading up to said chambers on one side, the strips G, connecting the said traps together and placed end to end, and the continuous cords or wires covered with coatings of tar and extending between the traps, substantially as specified.

3. The combination, with the traps provided with the chambers or recesses B, with vertical sides and ends and having inclined planes C running up on one side, the tarred cords or wires F, extending along the tops of the base-blocks on the sides opposite the inclined planes, and the tarred cords or wires $ff$, extending transversely across the tops of the ends of the chambers B, of the strips G, laid end to end, joined by leather strip or otherwise, and connecting the said traps, and the tarred cords or wires H, extending continuously from the cord or wire $f$ at one end of a trap to the similar cord or wire on the facing end of an adjacent trap, substantially as specified.

4. The combination of the traps A, provided with the chambers B, the inclined planes C, the posts or standards $d$, the covers or shades E, supported thereby, and the openings $i$ in their ends, the plugs I, stopping said openings, and the tarred cords or wires H, connecting the facing cords or wires $f$ of the traps, substantially as specified.

5. The trap comprising the chamber B, having the vertical walls and the inclined plane C on one side, the cover or screen arranged above the chamber for the purpose set forth, the diverging wings or strips G, extended from the chamber, and the tarred cord on said strips and on the upper edges of the end walls and side wall of the chamber opposite the inclined plane, substantially as described.

In testimony that I claim the foregoing as my own I have hereto affixed my signature in presence of two witnesses.

JOHN D. McMEEN.

Witnesses:
C. F. HAWKINS,
B. McMEEN.